H. W. PLEISTER.
CABLE CLAMP AND BRIDLE RING.
APPLICATION FILED OCT. 4, 1919.
1,365,610.
Patented Jan. 11, 1921.
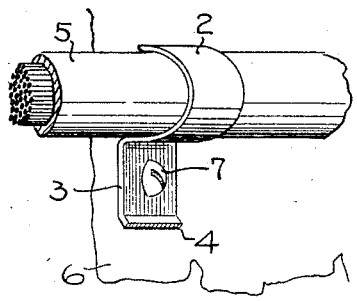
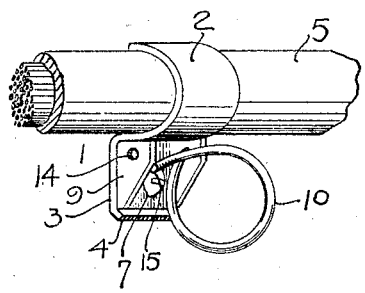
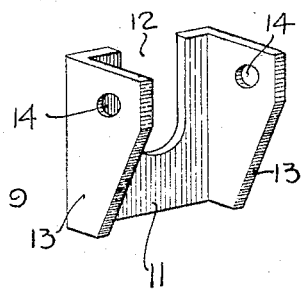
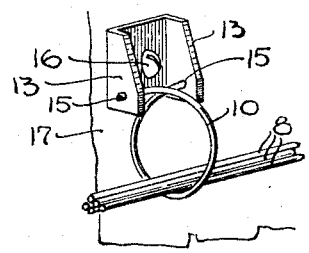
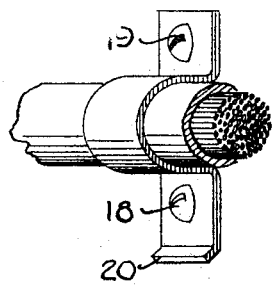
INVENTOR
Henry W. Pleister
BY Alan M. Johnson
ATTORNEY

UNITED STATES PATENT OFFICE.

HENRY W. PLEISTER, OF WESTFIELD, NEW JERSEY, ASSIGNOR TO HENRY B. NEWHALL, JR., EXECUTOR OF HENRY B. NEWHALL, DECEASED.

CABLE-CLAMP AND BRIDLE-RING.

1,365,610.  Specification of Letters Patent.  Patented Jan. 11, 1921.

Application filed October 4, 1919. Serial No. 328,519.

*To all whom it may concern:*

Be it known that I, HENRY W. PLEISTER, a citizen of the United States, residing at Westfield, in the county of Union and State of New Jersey, have invented certain new and useful Improvements in Cable-Clamps and Bridle-Rings, of which the following is a specification, taken in connection with the accompanying drawings.

My invention relates to the combination of a conduit and cable clamp and bridle ring, and also to a cable or conduit clamp and a bridle ring as sub-combinations of the main combination, and as articles of manufacture.

My invention further relates to a cable and conduit clamp, which can be manufactured at minimum expense and to which a bridle ring may be secured either at the original installation of the cable and conduit clamp, or at any future time when it may be desirable to support one or more runs of bridle wires.

My invention further relates to a non-threaded bridle ring, which may be used in combination with the conduit or cable clamp or independently. It further relates to such a bridle ring, which can be formed of relatively small gage wire. It further relates to such a bridle ring, which will form a complete closed loop around the bridle wire, or strands of bridle wires, and thereby prevent any accidental disengagement of the bridle wire from the bridle ring.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of a cable held to a wall or support by means of my conduit or cable clamp;

Fig. 2 is a perspective view similar to Fig. 1, showing the complete combination of my conduit or cable clamp with my bridle ring, the latter supporting strands of bridle wire;

Fig. 3 is a perspective view of the combined cable clamp and bridle ring showing the manner of snapping one of the arms of the bridle ring into its support;

Fig. 4 is a detail view of my bridle ring;

Fig. 5 is a perspective view of one form of support or carriage for the bridle ring, which is slipped under the head of the supporting screw to secure it either to the cable clamp, or to a wall when it is used simply as a bridle ring;

Fig. 6 is a perspective view of my bridle ring with its support used separately from the cable or conduit clamp; and Fig. 7 is a detail view of a modification in which the cable or conduit clamp, instead of being supported by one screw, is supported by two screws, being what is known as a two-hole cable clamp.

Previous to my invention bridle rings have been used with conduit and cable clamps. These bridle rings are what are known as "pig-tail," having one of their ends provided with machine screw threads to coöperate with machine female screw threads in the heel of the cable clamp. This has necessitated an extra thickness of metal in the heel of the conduit or cable clamp so as to provide sufficient female threads to support the shank of the commercial pig-tail bridle ring. When the cable clamp was formed of sheet metal the customary way to get this additional thickness of metal in the heel was to bend over sufficient additional metal to double the thickness of the metal in the heel. This necessitated the use of a large additional quantity of sheet metal with the consequent increase in cost of the resulting cable or conduit clamp. Attempts have been made to secure the conduit or cable clamp to a wall or other support by means of a pig-tail bridle ring provided with wood screw threads, but it has been found in practice that this is not satisfactory.

A bridle ring provided with wood screw threads can be used separately in wood but cannot be used successfully as a supporting means for the cable clamp. A bridle ring provided with machine screw threads can be used on a cable clamp, which has had its heel thickened and tapped with machine screw threads, but such a bridle ring provided with machine screw threads cannot be used independently in a wood or stone structure to support one or more bridle wires.

By my invention my bridle ring may be used with a conduit or cable clamp, or may be used independently to support strands of bridle wires on a wall or other support.

In the commercial use of conduit and cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my conduit and cable clamp may be used as a separate article of manufacture or sub-combination, and then later, when the needs of the service demands it, my bridle ring may be supported by the same conduit or cable clamp, when the complete combination would be used.

Various forms and embodiments of my invention may be made. In the present application and in other companion applications, filed herewith, Ser. No. 328,518 and Ser. No. 328,520, I have shown different embodiments of my invention, but it is to be distinctly understood that my invention is not to be confined to these particular forms, shown by way of example or illustration, but is only to be limited by the scope of my claims.

In my invention my conduit or cable clamp 1 is preferably formed of sheet metal and provided with a hook portion 2 and a heel 3 on which is provided a flange 4 to coöperate with and assist in holding my bridle ring support. The cable or conduit 5 is held to the wall or support 6 by means of the screw 7.

If, at the time of the original installation, or weeks, months or years thereafter, it is desirable to string one or more bridle wires 8, 8, I secure a non-threaded bridle ring upon the cable clamp 1, permitting the same screw 7 to secure the bridle ring.

In this form of my invention, I make the bridle ring out of the support 9 and the wire 10. The support 9 has a base 11, Fig. 5, provided with a slot 12, shoulders 13, 13, having openings 14, 14, to receive the outturned arms or catches 15, 15 of the ring. Preferably in attaching the bridle ring to the conduit or cable clamp 1, the screw 7 is loosened slightly so as to permit the support or carriage 9 to be slipped under the head of the screw 7 in a vertical direction past the flange 4. The screw is then tightened until it holds firmly the support or carriage 9. The spring ring 10 is then easily positioned by placing one of its arms or catches 15 in one of the holes 14, and then compressing the ring slightly so that the other arm or catch 15 will snap into the other hole 14 as shown in Fig. 3.

My bridle ring can be used separately to support strands of bridle wire 8, 8 as shown in Fig. 6, where screw 16 coöperates with the slot 12 to hold the bridle ring on its support 17.

It will be noted that in my improved construction there is but one thickness of metal in the heel 3 of the conduit or cable clamp; that no tapping or screw threading of the heel is required; that no screw threads on the bridle ring are necessary or desirable; that much thinner and lighter wire can be used to form my bridle ring than can be used in the ordinary commercial form of pig-tail bridle ring; and that a closed loop is formed around the strands of bridle wires so that they cannot become disengaged from the bridle ring.

In some cases I may use a two-hole cable clamp 17, Fig. 7, provided with the holes 18 and 19 for the reception of two securing screws. In this form I also provide a flange 20, which is similar and performs the same function as the flange 4 in the preferred construction.

Having thus described this invention in connection with an illustrative embodiment thereof, to the details of which I do not desire to be limited, what is claimed as new and what is desired to secure by Letters Patent is set forth in the appended claims.

What I claim is:—

1. The combination in a conduit and cable clamp of the clamp proper having a hook and heel portion and a bridle ring provided with catches or arms, and means carried by the clamp to coöperate with the catches or arms to hold the bridle ring.

2. A conduit and cable clamp formed from sheet metal having a single thickness of metal for both the heel and hook portions and a removable non-threaded bridle ring, and means to secure both ends of said bridle ring to the clamp.

3. A conduit and cable clamp provided with a heel and hook portion, a removable carriage, and a bridle ring having its two ends secured to the carriage.

4. A conduit and cable clamp provided with a heel and hook portion, a removable carriage provided with openings, and a spring bridle ring having its ends turned at an angle to hook into the openings in the carriage.

5. A new article of manufacture comprising a bridle ring support having means to support both ends of a bridle ring; a bridle ring carried at both its ends by said support, the support being provided with means to coöperate with a cable and conduit clamp or independently with its own fastening means permitting the bridle ring to be used either separately or with a cable and conduit clamp.

6. A bridle ring as a new article of manufacture comprising a closed spring ring having its ends turned at an angle to snap into a bridle ring support, a bridle ring support provided with openings to receive the ends of the spring bridle ring, said support being provided with a slotted base to coöperate with the head of a screw or other supporting member.

7. A conduit and cable clamp formed from sheet metal having a single thickness of metal for both the heel and hook portions, the heel being provided with a flange to coöperate with a bridle ring support.

8. A conduit and cable clamp formed from sheet metal having a hook portion and a heel portion, the heel portion being provided with an upturned flange, a bridle ring support having a base slotted substantially in the plane of the bridle ring to coöperate with the head of a screw, a bridle ring carried by the bridle ring support, said support being adapted to be slipped in under the head of the screw.

9. A conduit and cable clamp provided with means to engage both ends of a bridle ring, and a bridle ring having both its ends engaged with said means.

10. The combination in a conduit or cable clamp having a single thickness of metal, for both the heel and hook portions and a non-threaded bridle ring having both its ends carried by the conduit or cable clamp the bridle ring surrounding and preventing the accidental disengagement of bridle wires strung in the bridle ring.

11. The combination in a conduit or cable clamp having a single thickness of metal for both the heel and hook portions and a non-threaded spring bridle ring having both its ends carried by the conduit or cable clamp the ends of the bridle ring being adapted to spring into locking engagement, said bridle ring surrounding and preventing the accidental disengagement of bridle wires strung in the bridle ring.

HENRY W. PLEISTER.

Witnesses:
A. M. WILLIAMS,
M. R. RYAN.